US008572045B1

(12) United States Patent
Shah

(10) Patent No.: US 8,572,045 B1
(45) Date of Patent: Oct. 29, 2013

(54) SYSTEM AND METHOD FOR EFFICIENTLY RESTORING A PLURALITY OF DELETED FILES TO A FILE SYSTEM VOLUME

(75) Inventor: Dharmesh R. Shah, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 1044 days.

(21) Appl. No.: 12/237,719

(22) Filed: Sep. 25, 2008

(51) Int. Cl.
*G06F 7/00* (2006.01)
*G06F 17/00* (2006.01)

(52) U.S. Cl.
USPC .......................... 707/679; 707/674; 707/685

(58) Field of Classification Search
USPC .......................... 707/202, 649, 674, 679, 685
See application file for complete search history.

(56) References Cited

U.S. PATENT DOCUMENTS

| 7,440,965 | B1 | 10/2008 | Pruthi |
| 7,509,357 | B2 | 3/2009 | Lohn |
| 7,523,277 | B1 | 4/2009 | Kekre |
| 7,555,501 | B2 | 6/2009 | Kohno |
| 7,603,395 | B1 | 10/2009 | Bingham |
| 7,620,785 | B1 | 11/2009 | Coulter |
| 7,647,360 | B2 | 1/2010 | Kano |
| 7,650,533 | B1 | 1/2010 | Saxena |
| 7,653,800 | B2 | 1/2010 | Zohar |
| 7,685,378 | B2 | 3/2010 | Arakawa |
| 2004/0088301 | A1* | 5/2004 | Mahalingam et al. ........ 707/100 |
| 2011/0047195 | A1* | 2/2011 | Le et al. ........................ 707/827 |

OTHER PUBLICATIONS

"Yosemite Server Backup User's Guide," Barracuda Networks, Inc., Copyright 2004, 2009.
"User's Manual—Undelete® for Windows®", Diskeeper Corp., Jul. 2007.
"CDP Server User Guide," BBS Technologies Inc., 2008.

* cited by examiner

*Primary Examiner* — Etienne LeRoux
*Assistant Examiner* — Chelcie Daye
(74) *Attorney, Agent, or Firm* — Meyertons, Hood, Kivlin, Kowert & Goetzel, P.C.

(57) ABSTRACT

Various embodiments of a system and method for restoring a plurality of files previously deleted from a volume are described. For each respective file of the plurality of deleted files, the method may operate to determine a time at which the respective file was last modified and a time at which the respective file was deleted. These times define a respective recovery time window for the respective file. The method may further comprise determining a particular point in time that is within the recovery time windows for two or more of the plurality of deleted files. A temporary version of the volume as it existed at the particular point in time may be created, and each file of the two or more files may be restored to the volume from the temporary version of the volume.

12 Claims, 20 Drawing Sheets

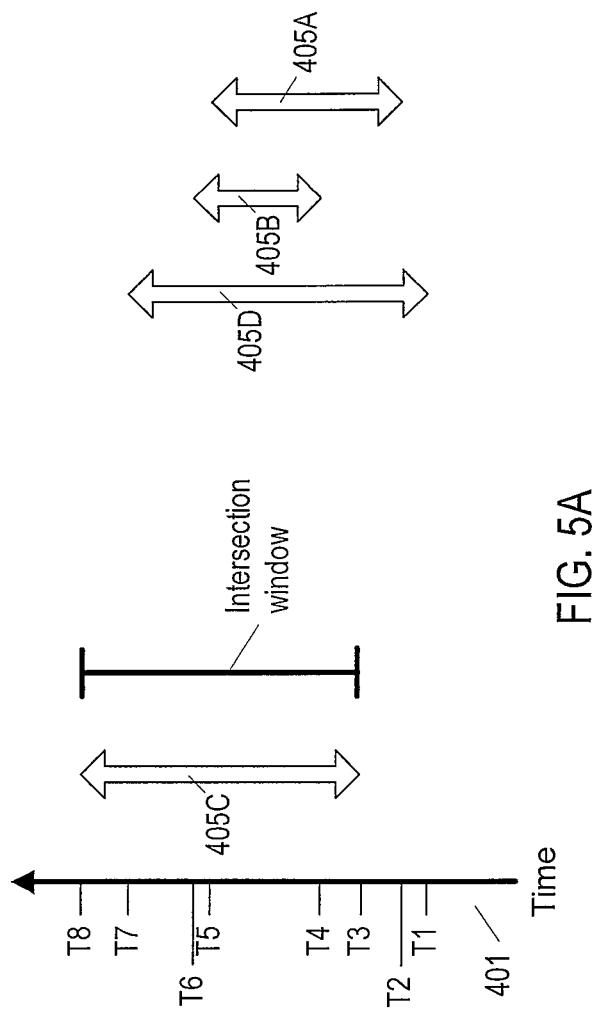

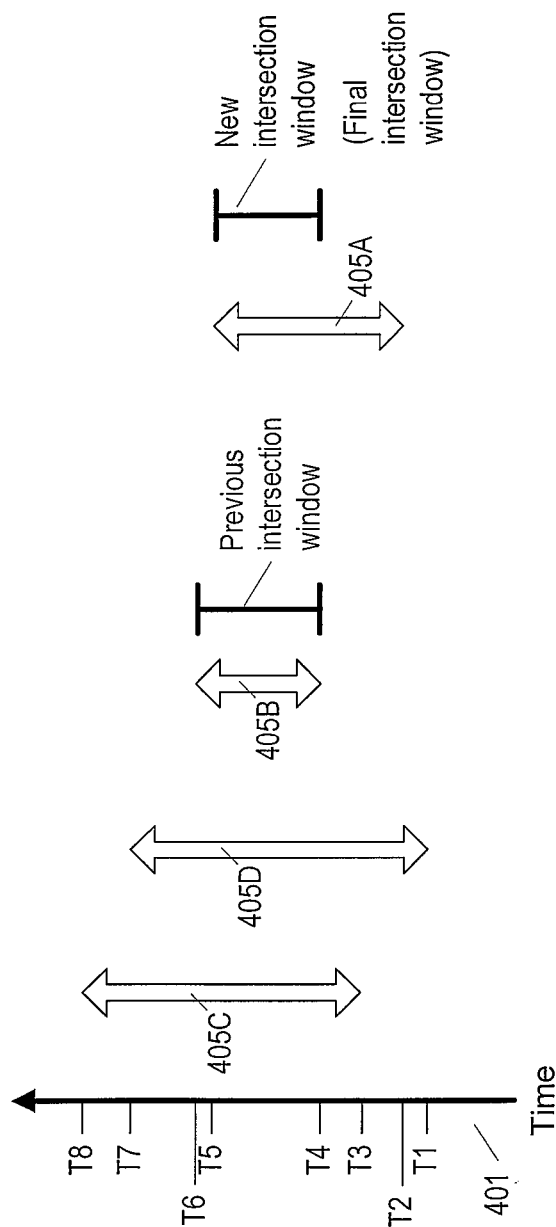

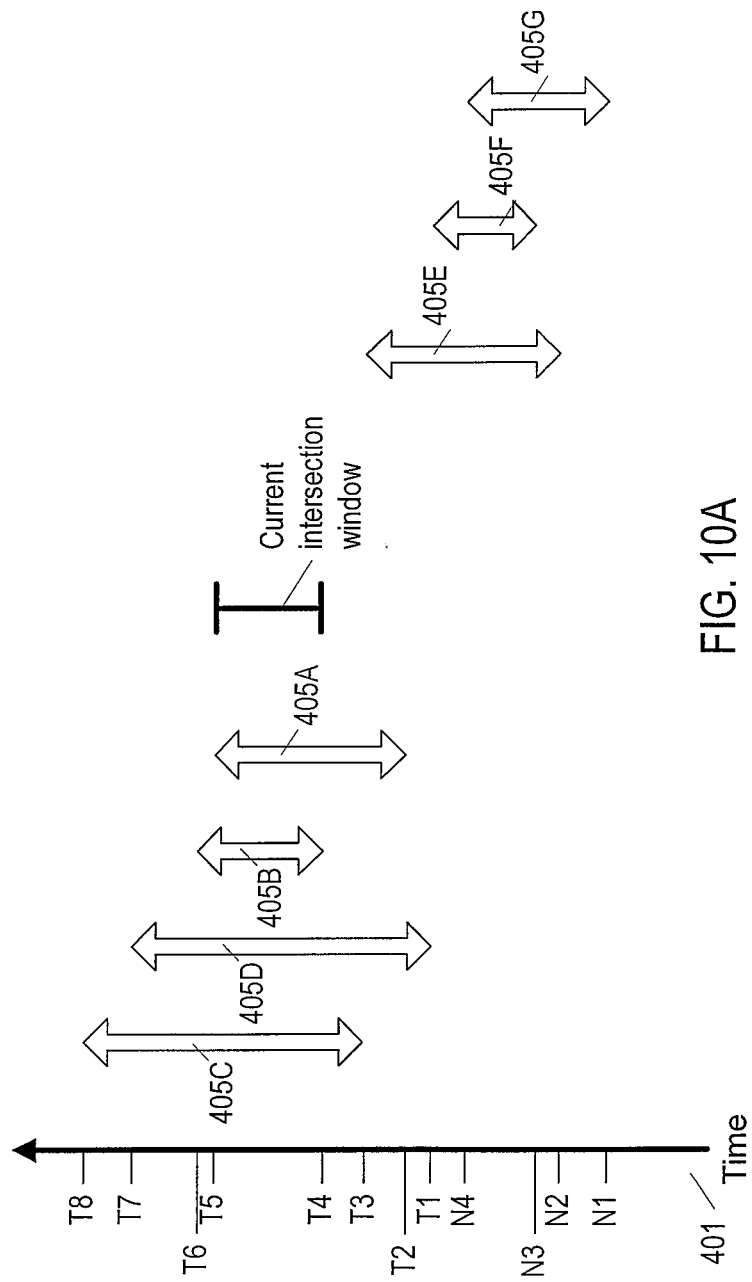

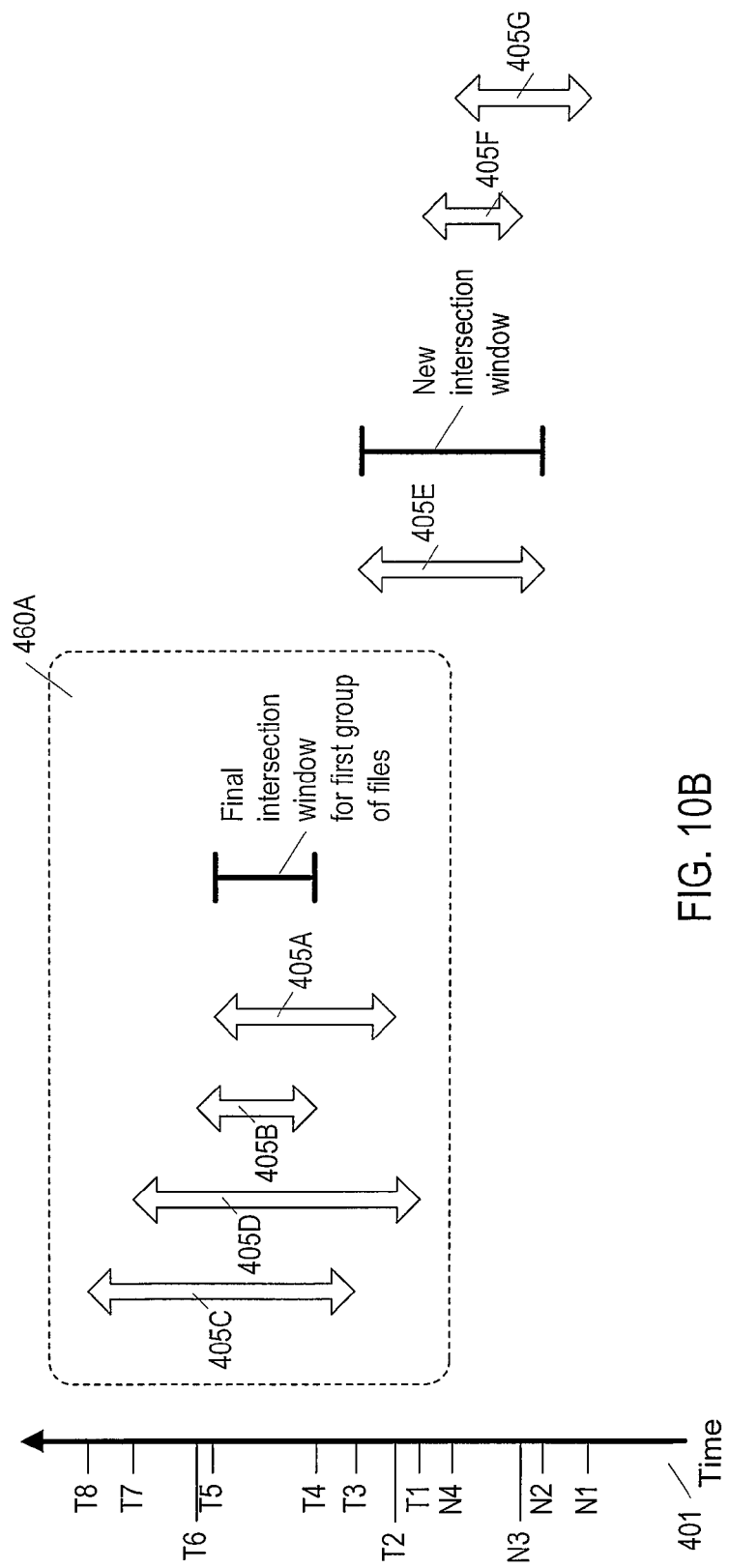

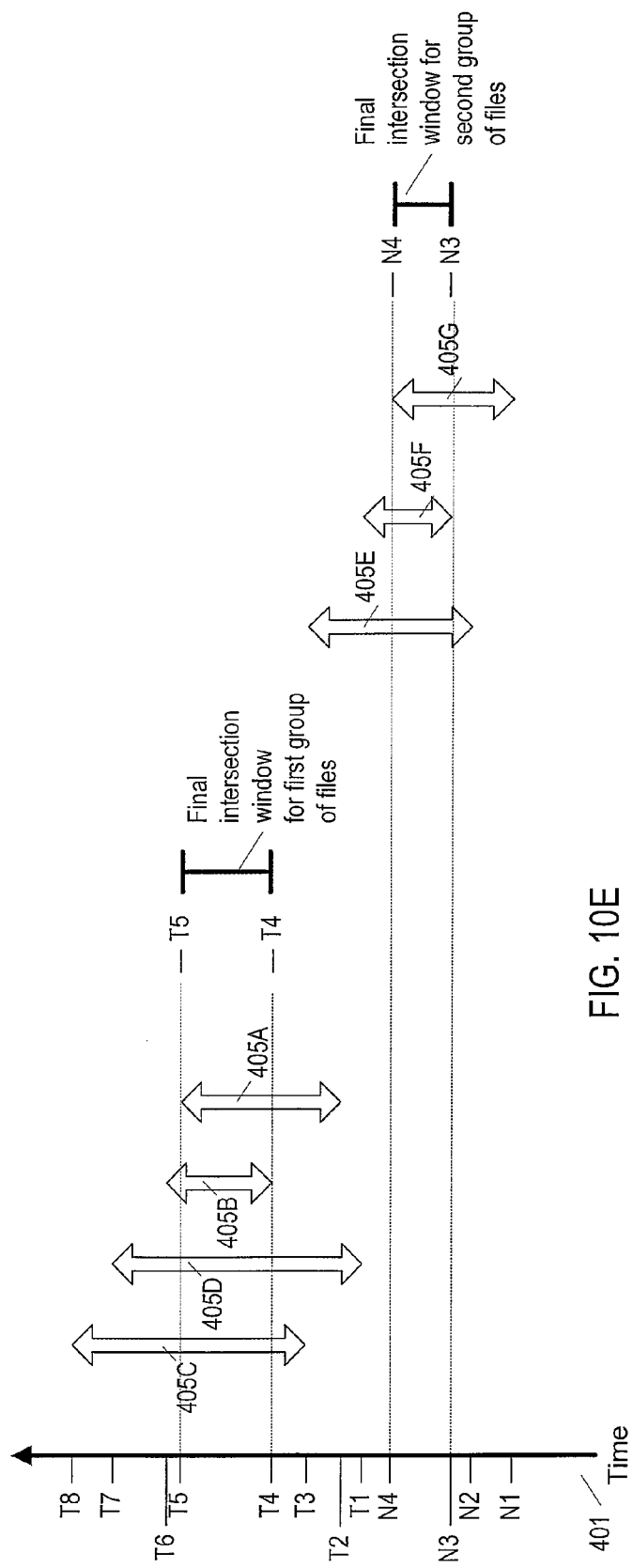

SYSTEM AND METHOD FOR EFFICIENTLY RESTORING A PLURALITY OF DELETED FILES TO A FILE SYSTEM VOLUME

BACKGROUND OF THE INVENTION

1. Field of the Invention

This invention relates to backup and recovery software for a computer system. More particularly, the invention relates to a system and method for efficiently restoring a plurality of deleted files to a file system volume.

2. Description of the Related Art

Many computer systems use data stored as files in a file system volume. Backup software is often used to backup the files to protect against data loss or data corruption. One general type of backup technique is to create a backup image of the entire file system volume. The backup image may represent a copy of the volume at a certain point in time, e.g., may include a copy of the data for all the files in the volume as the data exists at that point in time. The backup software may operate to create backup images at scheduled intervals. Recovery software can then use the backup images to restore the data in the event that it becomes necessary to do so. For example, the user may select to restore one or more files from the most recent backup image and/or from one or more of the older backup images.

Another general type of backup technique is referred to as continuous data protection (CDP). In a CDP solution, the file data is continuously backed up in real time as the files in the volume are changed. For example, continuous data protection may be provided for the volume at the block level. Each time a data block of a file in the volume is changed, a copy of the block may be copied into a CDP log, along with a timestamp indicating the current time. Thus, for any given block in the volume, there may be multiple copies of the block in the CDP log, where each copy corresponds to one of the times when the block was changed. Since the data is continuously backed up, the CDP log can be used to restore the volume to its state as it existed at virtually any specified point in time by using the timestamp information in the CDP log to find the appropriate copy of each respective block of the volume, e.g., the copy which represents the state of the respective block at the specified point in time.

SUMMARY

Various embodiments of a system and method for restoring a plurality of files previously deleted from a volume are described herein. According to some embodiments, for each respective file of the plurality of deleted files, the method may operate to determine a time at which the respective file was last modified and a time at which the respective file was deleted. The time at which the respective file was last modified and the time at which the respective file was deleted may define a respective recovery time window for the respective file.

The method may further comprise determining a particular point in time that is within the recovery time windows for two or more of the plurality of deleted files. A temporary version of the volume as it existed at the particular point in time may be created, and each file of the two or more files may be restored to the volume from the temporary version of the volume.

In some embodiments, determining the particular point in time that is within the recovery time windows for the two or more files may comprise calculating an intersection of the recovery time windows for the two or more files, and selecting the particular point in time as a point in time within the intersection.

In some embodiments the two or more files may include all of the files in the plurality of files. In other embodiments the two or more files may include only a first subset of the plurality of files. In further embodiments the method may operate to restore a second subset of the plurality of files by determining a second point in time that is within the recovery time windows for the files in the second subset. A second temporary version of the volume as it existed at the second point in time may be created, and each file of the second subset may be restored to the volume from the second temporary version of the volume.

BRIEF DESCRIPTION OF THE DRAWINGS

A better understanding of the invention can be obtained when the following detailed description is considered in conjunction with the following drawings, in which:

FIGS. 5A-5E illustrate one embodiment of an algorithm for processing the files of FIG. 4 in the sorted order to determine an intersection of the recovery time windows for the files;

FIGS. 10A-10E illustrate one embodiment of an algorithm for processing the files of FIG. 9 to determine respective intersection windows for two different subsets of the files;

Figure 1:
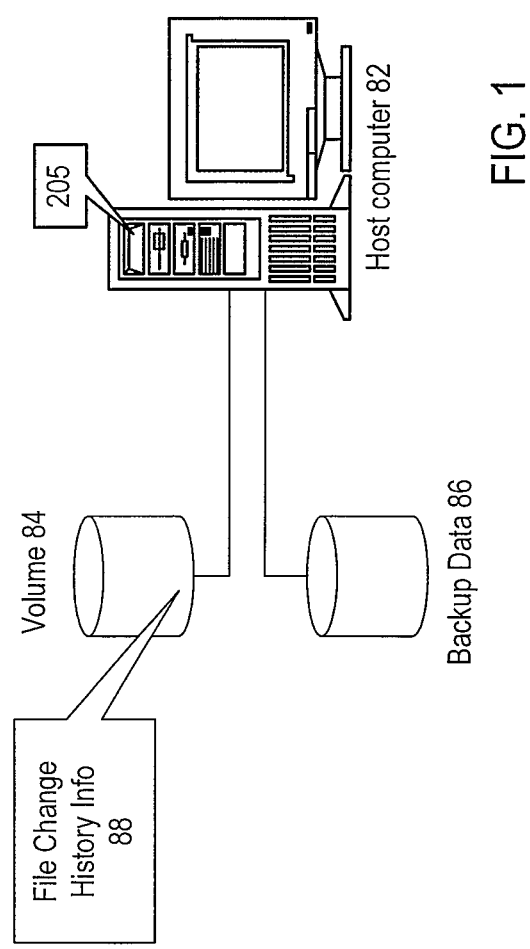
FIG. 1 illustrates one embodiment of a system configured to restore a plurality of files previously deleted from a volume.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for restoring a plurality of deleted files are described herein. As illustrated in FIG. 1, the system may include a host computer 82 configured to use a volume 84. As used herein, the term "volume" refers to a set of files managed by file system software. In various embodiments the volume may be managed or implemented in accordance with any of various kinds of files systems. Examples of file systems include File Allocation Table (FAT) file systems (e.g., FAT32, FAT16, etc.); NTFS file systems; VxFS file systems; Hierarchical File System (HFS) file systems; etc.

The system and method may utilize file change history information 88. In some embodiments the file change history information 88 may be created and managed by the file system. Files in the volume 84 may change over time. For example, various files in the volume may be created, deleted, and/or modified over time. The file change history information 88 may specify various changes that have occurred to the files and may specify when the changes occurred. For example, each time a file is created, modified, or deleted, the file system may update the file change history information 88 to include a new record indicating the time at which the file was created, modified, or deleted.

The host computer 82 may execute backup and recovery software 205, which is operable to create backup data 86 from the volume 84. For example, in some embodiments the backup data 86 may include one or more backup images created by the backup and recovery software 205. Each backup image may include a backup copy of data for one or more of the files in the volume 84 as the data exists at that point in time.

In other embodiments the backup data 86 may include a continuous data protection (CDP) log. The CDP log may include block-level information useable to restore the volume 84 to a specified point in time. The backup and recovery software 205 may use any conventional CDP techniques known in the art to create and maintain the CDP log. For example, in some embodiments, each time a write occurs to a block of a file in the volume 84, the backup and recovery software 205 may copy the new data for the block into the CDP log, and may also store the current timestamp in association with the new data to indicate the time at which the block was changed. Thus, for any given block in the volume 84, there may be multiple copies of the block in the CDP log, where each copy corresponds to one of the times when the block was changed.

In a typical embodiment, the volume 84 and the backup data 86 may be stored on or may be accessed through separate storage devices, each of which is coupled to the host computer 82. Each of the storage devices may be any type of device operable to store data. Examples of storage devices include disk storage units (e.g., devices including one or more disk drives), tape storage devices (e.g., devices operable to store data on tape cartridges), optical storage devices (e.g., devices operable to store data on optical media), flash memory storage devices, etc. Each of the storage devices may be included in or coupled to the host computer 82 in any of various ways, such as through a communication bus or other interface, or through a network.

It may sometimes be necessary to restore files that have been deleted from the volume 84. For example, users may accidentally delete files, or files may become corrupted. The backup and recovery software 205 may be operable to use the backup data 86 to restore files that have been deleted. For example, where the backup data 86 includes a backup image created at a previous time before the file was deleted from the volume 84, the file may be restored by copying the file from the backup image back into the volume 84.

As another example, where the backup data 86 includes CDP log information, the file may be restored by using the CDP log information to restore the volume 84 to a temporary version of the volume 84 as the volume 84 existed at a particular point in time before the file was deleted from the volume. The file may then be copied from the temporary version of the volume 84 into the actual volume 84. In various embodiments the point in time to which to restore the volume 84 may be specified with varying degrees of specificity, e.g., depending upon the time resolution at which data block changes are recorded in the CDP log. For example, in some embodiments the point in time may be specified in units of seconds. In other embodiments the point in time may be specified more precisely, e.g., with millisecond or microsecond resolution.

In some embodiments the CDP log may specify data changes that have occurred within a particular protection time window relative to the current time, e.g., changes within the past 24 hours, or changes within the past 48 hours, etc. (In various embodiments the protection time window can be any arbitrary length of time. In some embodiments the CDP log may include information specifying changes that have occurred for the entire lifespan of the volume, assuming that enough storage space is available to store all of the CDP log data.) Thus, the CDP log data can be used to restore the deleted file if the file was deleted within the protection time window. If the file was deleted before the protection time window began then other techniques may be used to restore the file, e.g., using a full backup image created before the protection time window began.

Any of various techniques may be used to restore the volume 84 to the temporary version of the volume 84 using the CDP log information. In some embodiments the backup data 86 may include both backup images and the CDP log. For example, the protection time window provided by the CDP log may be 48 hours, and the backup data 86 may also include a particular full or incremental backup image created within the past 48 hours. Thus, the volume 84 may be restored to a temporary version of the volume 84 as the volume 84 existed at any arbitrary point in time within the past 48 hours by first restoring the particular backup image to the temporary version of the volume 84, and then using the timestamp information and data block copies in the CDP log to modify the blocks in the temporary version of the volume 84 so that the data in the temporary version of the volume 84 represents the state of the volume 84 at the desired point in time. In other embodiments the temporary version of the volume 84 may be created by first creating a copy of the volume 84 in its current state (e.g., as copy-on-write (COW) snapshot) and then using the CDP log information to roll back the state of the data blocks in the copy of the volume 84 to their respective states at the desired point in time.

Suppose now that a user or application requests to restore a plurality of files that have been deleted within the protection time window provided by the CDP log information. One way to restore all of the files would be to use the CDP log data to restore the volume 84 to a respective temporary version of the volume 84 as the volume 84 existed before each respective file was deleted. The respective file could then be copied from the respective temporary version of the volume 84 to the actual volume 84. Thus, this technique may involve creating a separate point-in-time temporary volume for each file that needs to be restored.

Figure 2:
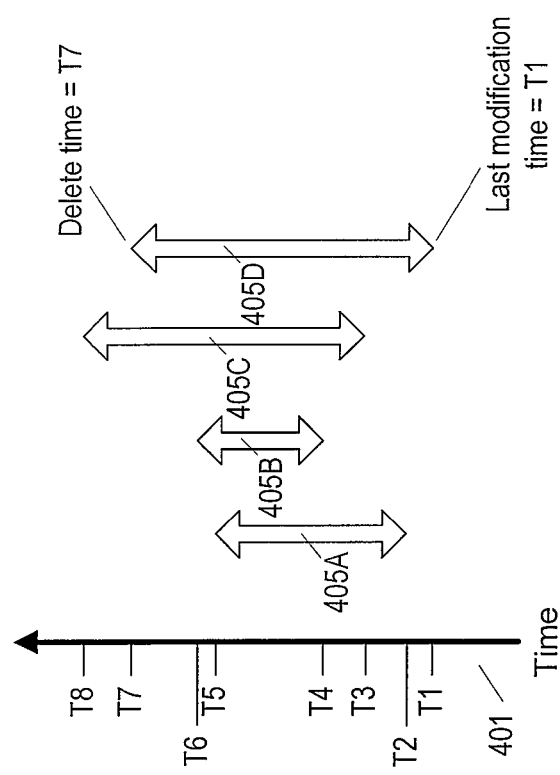
FIG. 2 illustrates an example of four files to be restored.

For example, FIG. 2 illustrates an example in which four files 405 need to be restored. The axis 401 represents the passage of time, such that time T1 occurs before time T2, time T2 occurs before time T3, etc. Each file 405 is represented by a respective arrow, where the bottom of the arrow indicates the time at which the file was last modified before being deleted, and the top of the arrow represents the time at which the file was deleted. For example, the file 405D was last modified at time T1 and was deleted at time T7. Similarly, the file 405C was last modified at time T3 and was deleted at time T8. The respective last modification times and delete times for the other files 405A and 405B are similarly illustrated.

It is assumed throughout the present disclosure that when a file needs to be restored, it is desired to restore the most recent version of the file, which is the most typical use case desired by users. The most recent version of the file is the version of the file as it existed between the last time it was modified (e.g., the last time its data was changed) and the time it was deleted. Thus, the last modification time and the delete time define a recovery time window for the file. Thus, the file can be restored from a point-in-time representation of the volume 84 as the volume 84 existed at any point in time within the recovery time window for the file.

For example, one way to restore the four files in FIG. 2 would be to use the CDP log to create a first temporary version of the volume 84 as the volume 84 existed just before the time T5, and then restore the file 405A from the first temporary version of the volume 84; create a second temporary version of the volume 84 as the volume 84 existed just before the time T6, and then restore the file 405B from the second temporary version of the volume 84; create a third temporary version of the volume 84 as the volume 84 existed just before the time T8, and then restore the file 405C from the third temporary version of the volume 84; and create a fourth temporary version of the volume 84 as the volume 84 existed just before the time T7, and then restore the file 405D from the fourth temporary version of the volume 84. Thus, a separate point-in-time temporary volume for each file that needs to be restored may be created and used to restore the file. However, the process of creating a point-in-time temporary volume from the CDP log data may be relatively expensive to perform in terms of time and/or computing resources required. Thus, a more efficient method for restoring a plurality of files may be desired, e.g., a technique that reduces the number of point-in-time temporary volumes created.

Figure 3:
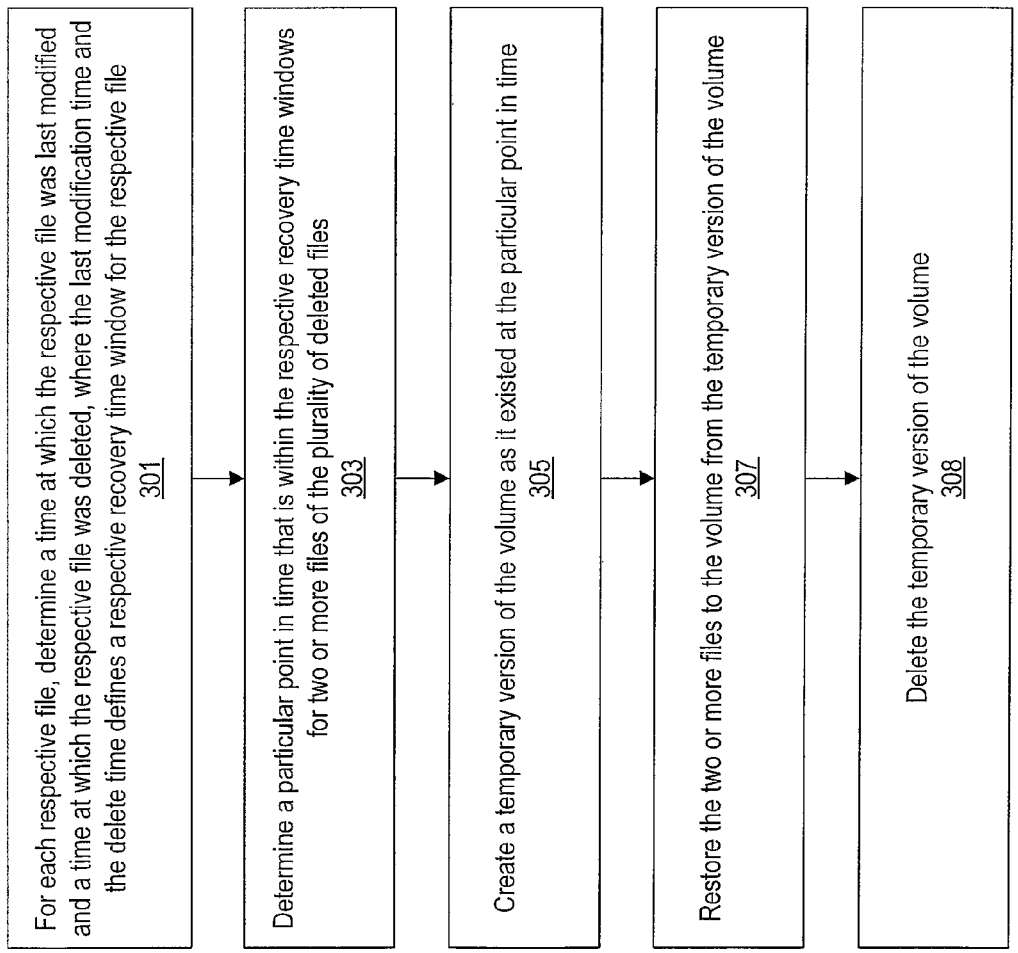
FIG. 3 is a flowchart diagram illustrating one embodiment of a method for restoring a plurality of deleted files.

FIG. 3 is a flowchart diagram illustrating one embodiment of a method for restoring a plurality of deleted files. The method may be implemented by software, e.g., the backup and recovery software 205 executing on the host computer 82.

As indicated in block 301, for each respective file of the plurality of deleted files, the backup and recovery software 205 may determine a time at which the respective file was last modified and a time at which the respective file was deleted. As discussed above, the last modification time and the delete time define a respective recovery time window for the respective file. The backup and recovery software 205 may determine the last modification time and the delete time for each file from the file change history information 88.

As indicated in block 303, the backup and recovery software 205 may determine a particular point in time that is within the respective recovery time windows for two or more files of the plurality of deleted files. Thus, for each respective file of the two or more files, the particular point in time is later than the time when the respective file was last modified and is before the time when the respective file was deleted.

As indicated in block 305, the backup and recovery software 205 may create a temporary version of the volume as it existed at the particular point in time. For example, in some embodiments the temporary version of the volume may be created by using the CDP log information (possibly in conjunction with either the volume 84 itself, or with a backup image of the volume) to restore the volume 84 to a point-in-time representation of the volume as it existed at the particular point in time.

As indicated in block 307, the backup and recovery software 205 may restore the two or more files to the volume 84 from the temporary version of the volume created in block 305, e.g., by copying each file of the two or more files from the temporary version of the volume to the actual volume 84. This results in the most recent versions of the two or more files being restored since the particular point in time to which the temporary version of the volume corresponds is within the respective recovery time window of each file of the two or more files.

As indicated in block 308, the backup and recovery software 205 may then delete or remove the temporary version of the volume, e.g., since it may no longer be needed after the two or more files have been restored.

In some cases, there may be a point in time that is within the respective recovery time windows for all of the files of the plurality of deleted files. Thus, in some cases the "two or more files" referred to above may be the complete set of the plurality of files. Thus, in some embodiments only one point-in-time temporary version of the volume 84 may need to be created in order to restore all of the deleted files. In other cases, there may not be any point in time that is within the respective recovery time windows for all of the files of the plurality of deleted files. Thus, in some embodiments it may be necessary to create multiple temporary versions of the volume, where each one represents the state of the volume at a different point in time, and where each one is used to restore one or more files of the plurality of files. In this case, at least one of the respective temporary versions of the volume may be used to restore multiple files of the plurality of files.

Figure 4:
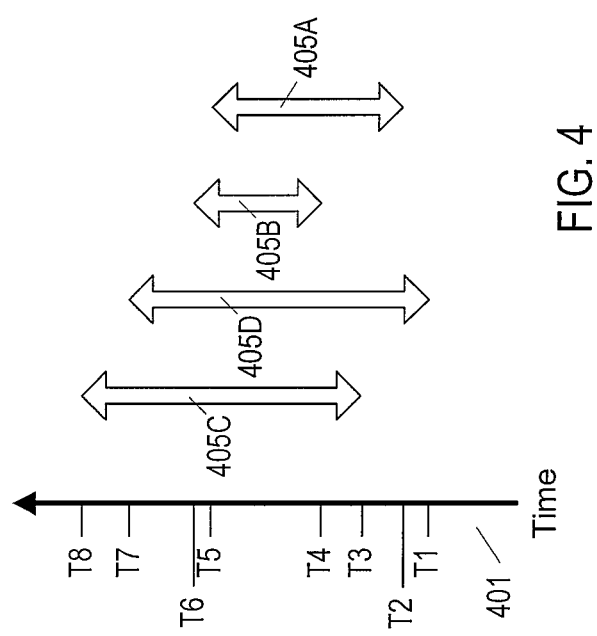
FIG. 4 illustrates the plurality of files shown in FIG. 2, where the files have been sorted according to reverse chronological order of their respective delete times.

Thus, various embodiments of the method of FIG. 3 may enable a plurality of deleted files to be restored efficiently. In various embodiments the backup and recovery software 205 may implement any desired algorithm or technique to determine a particular point in time that is within the respective recovery time windows for two or more files. In some embodiments the algorithm for determining the particular point in time may operate to sort a list of the files, e.g., either according to their delete times or according to their last modification times. FIG. 4 illustrates the plurality of files shown in FIG. 2, where the files have been sorted according to reverse chronological order of their respective delete times. The first file in the sorted order is the file 405C, which was deleted at the time T8. The next file in the sorted order is the file 405D, which was deleted at the time T7, and so on. After sorting the list of files, the algorithm may process the list of files in the sorted order as illustrated in FIGS. 5A-5E.

The algorithm may operate to determine an intersection of the recovery time windows for the files, e.g., a window of time in which the respective recovery time windows intersect.

As illustrated in FIG. 5A, the algorithm first sets an intersection window to be the same as the recovery time window of the first file in the list, e.g., the file 405C in this example. The intersection window is a window of time defined by a start time and an end time. The algorithm may set the intersection window to be the same as the recovery time window of the file 405C by storing information indicating that the start time of the intersection window is the last modification time of the file 405C (time T3), and the end time of the intersection window is the delete time of the file 405C (time T8).

Figure 5B:
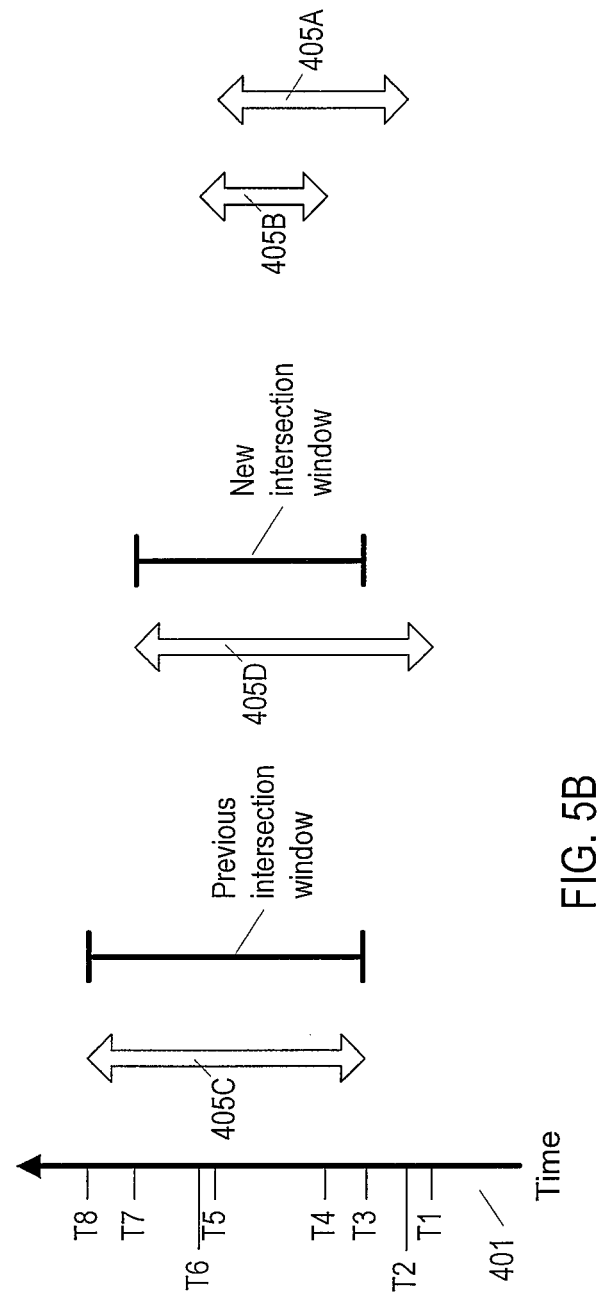

The algorithm may then process the rest of the files in the sorted order, updating the intersection window as it goes along by intersecting it with the recovery time window of the next file in the list. For example, as illustrated in FIG. 5B, the algorithm checks to see whether the previous intersection window (i.e., the intersection window initially set in FIG. 5A) intersects with the recovery time window of the next file in the list, i.e., file 405D. In this example there is an intersection, which is defined by the period of time in which the previous intersection window overlaps with the recovery time window of the file 405D. Thus, the algorithm updates the intersection window to reflect this intersection, as illustrated in FIG. 5B by the "New intersection window". The new intersection window still starts at time T3, but ends at the delete time of the file 405D, i.e., time T7.

Figure 5C:
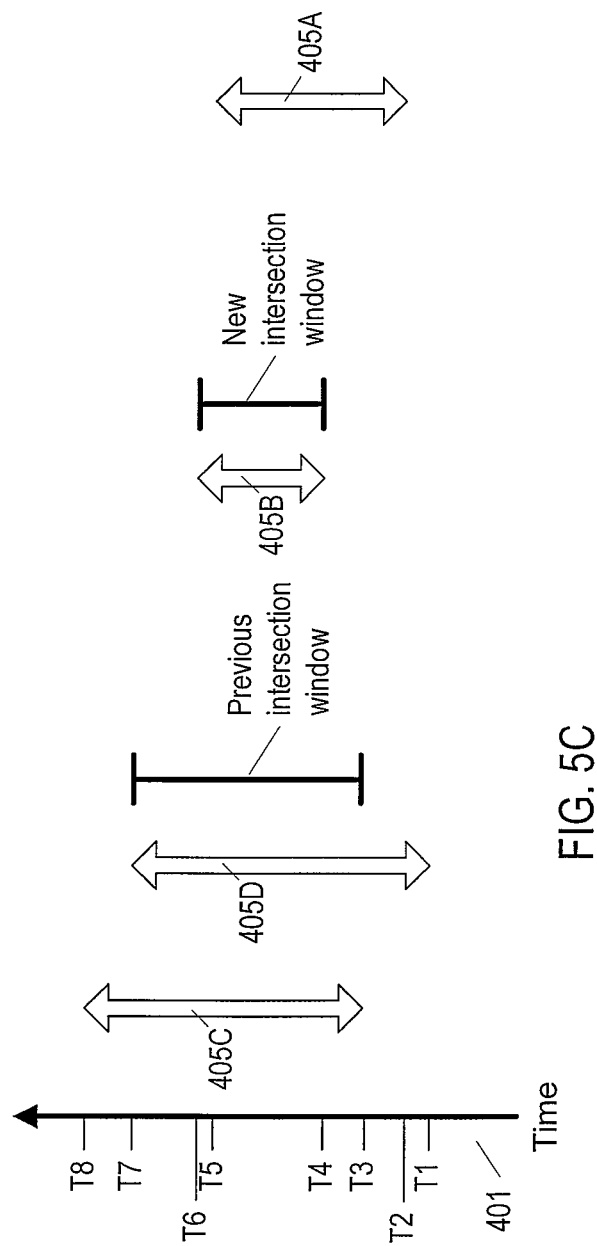

As illustrated in FIG. 5C, the algorithm then processes the next file, i.e., file 405B. Similarly as described above, the previous intersection window is intersected with the recovery time window of the file 405B. The resulting intersection is illustrated in FIG. 5C as the "New intersection window". In this example, the new intersection window is the same as the recovery time window for the file 405B, i.e., is the time period between time T4 and time T6.

As illustrated in FIG. 5D, the algorithm then processes the next file, i.e., file 405A. Similarly as described above, the previous intersection window is intersected with the recovery time window of the file 405A. The resulting intersection is illustrated in FIG. 5D as the "New intersection window". The new intersection window still starts at time T4, but ends at the delete time of the file 405A, i.e., time T5.

Figure 5E:
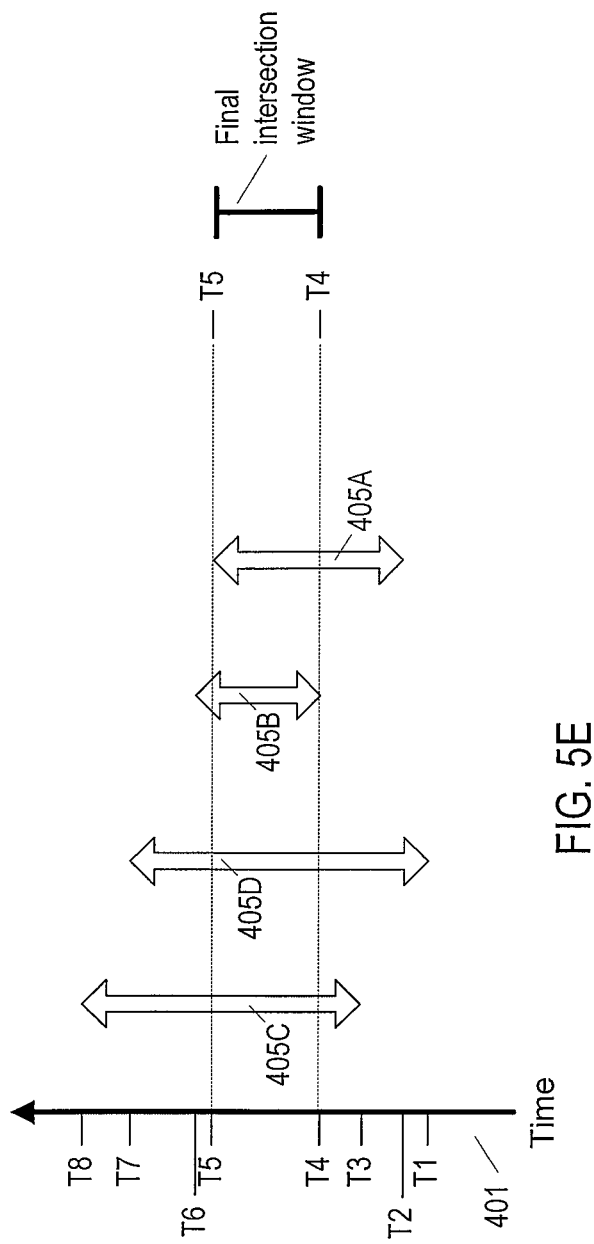

Since there are no more files to be processed, the new intersection window computed in FIG. 5D is also the final intersection window. In this example, any point in time within the final intersection window can be used to restore the most recent versions of all of the files 405A-405D since all of the respective recovery time windows for the four files overlap during the time period defined by the final intersection window, as illustrated in FIG. 5E. Thus, in this example, all four of the files 405A-405D can be restored by creating only one point-in-time temporary version of the volume using the CDP log information.

Figure 6:
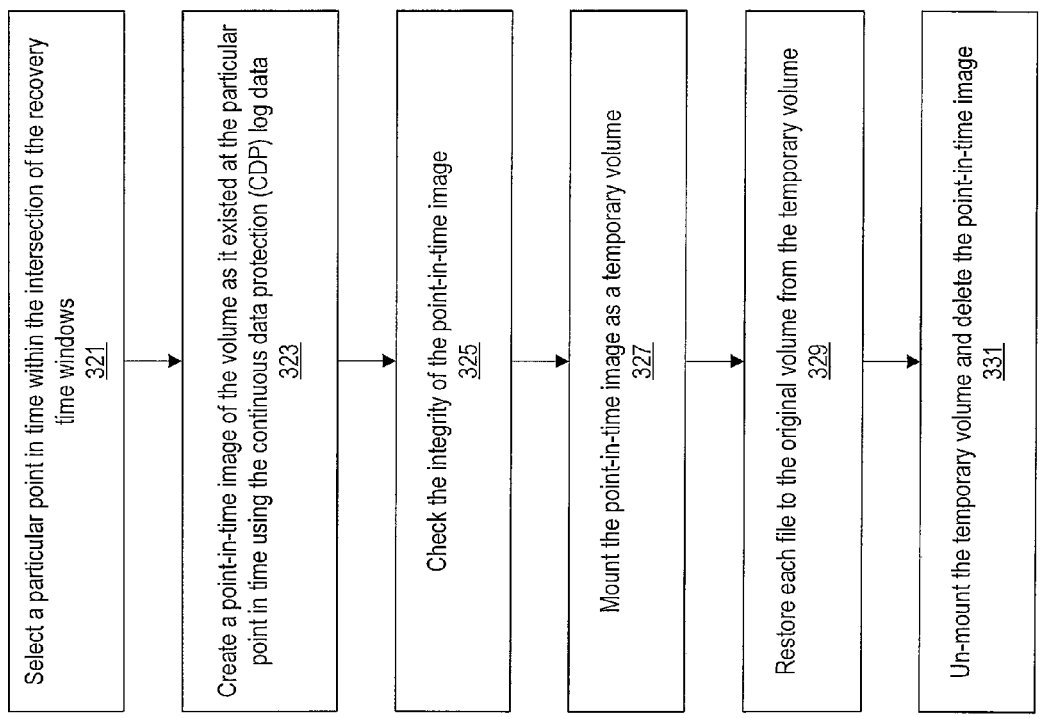
FIG. 6 is a flowchart diagram illustrating one embodiment of a method for restoring the files once the intersection of their recovery time windows has been determined.

FIG. 6 is a flowchart diagram illustrating one embodiment of a method for restoring the files once the intersection of their respective recovery time windows has been determined as described above.

As indicated in block 321, the backup and recovery software 205 may select a particular point in time within the intersection of the recovery time windows, e.g., a particular point in time within the final intersection window shown in FIG. 5E. In various embodiments, any point in time within the final intersection window may be selected, e.g., depending upon the time resolution supported by the CDP log information. The point in time may be selected at any location within the final intersection window. For example, in some embodiments the point in time may be selected as a point just before (e.g., a few seconds or milliseconds before) the end of the final intersection window, e.g., time T5 in this example. In other embodiments the point in time may be selected as a point just after the beginning of the final intersection window, e.g., time T4 in this example. In other embodiments the point in time may be selected as a point approximately halfway between the beginning and the end of the final intersection window.

As indicated in block 323, the backup and recovery software 205 may use the CDP log data to create a point-in-time image or snapshot of the volume as it existed at the particular point in time. Thus, the point-in-time image may include the data of the files in the volume, as well as possibly metadata for the volume, as the data and metadata existed at the particular point in time.

As indicated in block 325, the backup and recovery software 205 may check the integrity of the point-in-time image. For example, the backup and recovery software 205 may invoke a file system check operation to check the integrity of the point-in-time image and the consistency of the files therein. In some embodiments the file system check operation may modify the point-in-time image to correct errors if it finds any.

As indicated in block 327, the backup and recovery software 205 may then mount the point-in-time image as a temporary volume. Mounting the point-in-time image as a temporary volume refers to an operation which makes the files in the point-in-time image available for access through the temporary volume. For example, the backup and recovery software 205 may request the file system software on the host computer 82 to mount the point-in-time image as the temporary volume.

As indicated in block 329, the backup and recovery software 205 may then restore each file to the original volume 84 from the temporary volume, e.g., by copying each file from the temporary volume to the original volume 84. This effectively recovers or un-deletes the files.

As indicated in block 331, the backup and recovery software 205 may then un-mount the temporary volume and delete the point-in-time image.

Figure 7:
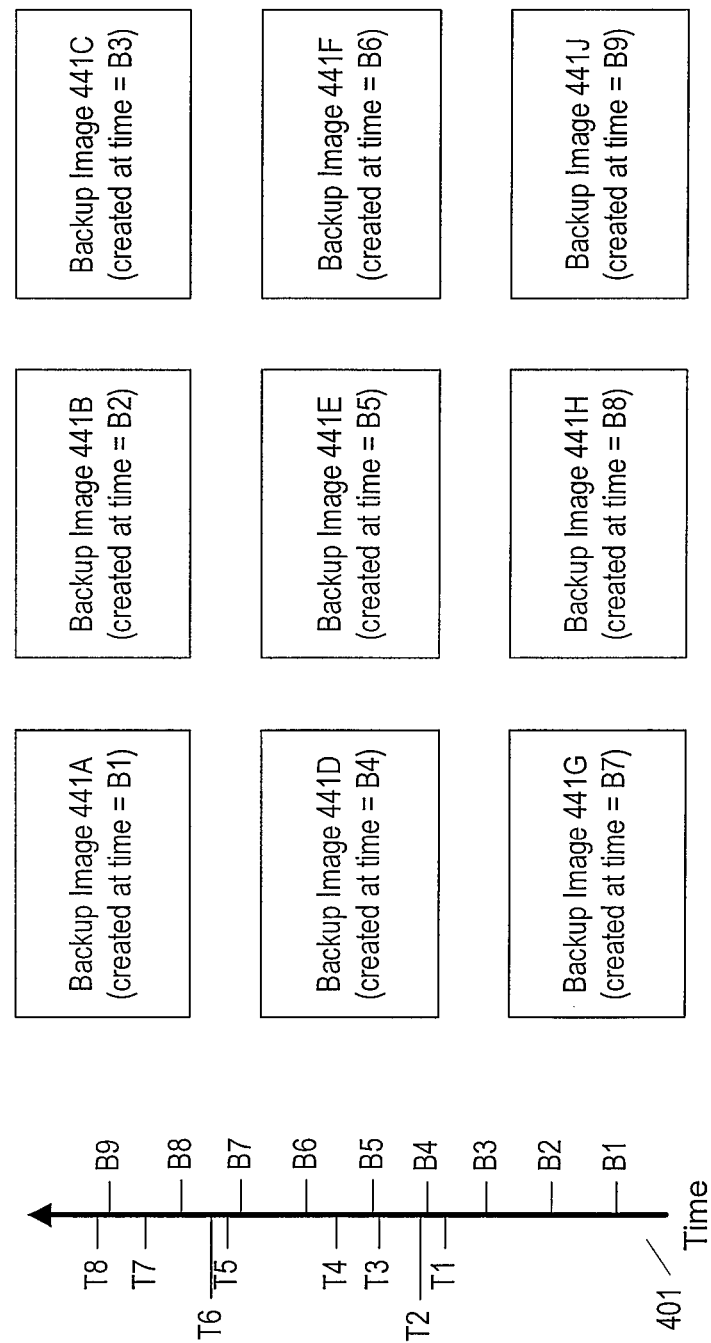
FIG. 7 illustrates a plurality of backup images of a volume.

In an alternative embodiment the files may be restored without using CDP log information. Instead the files may be restored from one or more backup images previously created and stored. For example, suppose that the final intersection for the four files 405A-405D has been computed as described above with reference to FIGS. 5A-5E. FIG. 7 illustrates an embodiment in which the backup data 86 includes a plurality of backup images 441A-441J. For example, each backup image may be a full backup image or an incremental backup image of the volume 84. FIG. 7 also illustrates the times at which the backup images were created. For example, the backup image 441A was created at time B1, the backup image 441B was created at time B2, etc. The time axis 401 illustrates how the creation times of the backup images relate to the times T1-T8 which correspond to the last modification times and delete times of the files 405A-405D.

As discussed above and shown in FIG. 5E, the final intersection window for the files 405A-405D is bounded by the times T4 and T5. As illustrated in FIG. 7, there are two backup images that were created within this time window, i.e., the backup image 441F created at time B6 and the backup image 441G created at time B7. Thus, either of these two backup images may be used to restore all four of the files 405A-405D.

Figure 8:
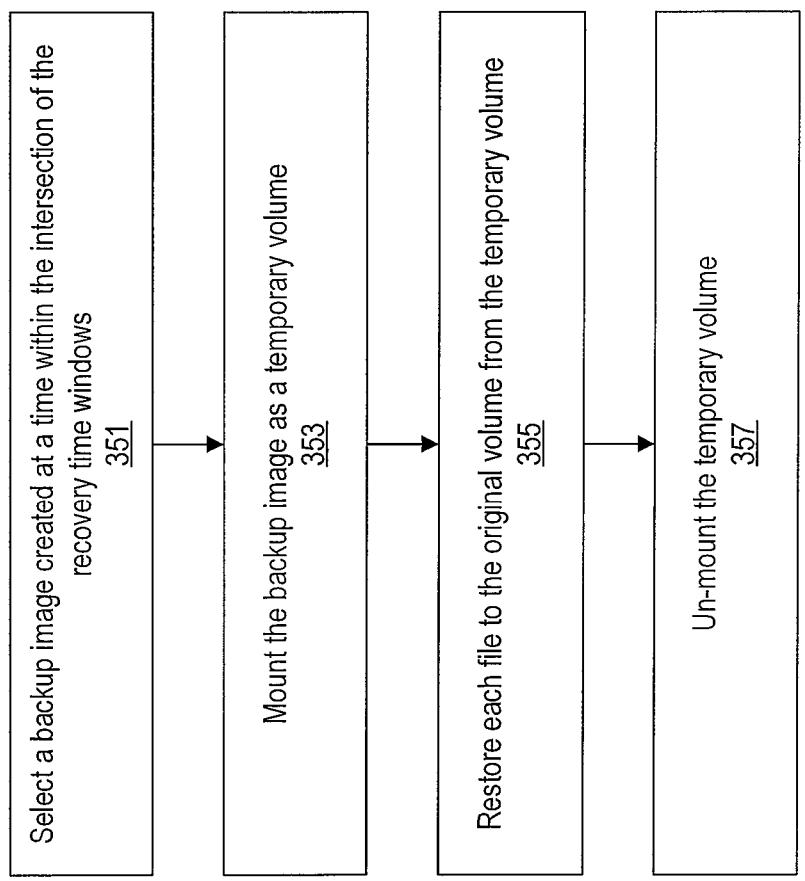
FIG. 8 is a flowchart diagram illustrating one embodiment of a method for restoring the files from a backup image once the intersection of their recovery time windows has been determined.

FIG. 8 is a flowchart diagram illustrating one embodiment of a method for restoring the files from a backup image once the intersection of their respective recovery time windows has been determined as described above.

As indicated in block 351, the backup and recovery software 205 may select a backup image that was created at a time within the intersection of the recovery time windows of the files. For example, the backup and recovery software 205 may select either the backup image 441F or the backup image 441G in this example.

As indicated in block 353, the backup and recovery software 205 may mount the backup image as a temporary volume.

As indicated in block 355, the backup and recovery software 205 may restore each file to the original volume 84 from the temporary volume, e.g., by copying each file from the temporary volume to the original volume.

As indicated in block 357, the backup and recovery software 205 may then un-mount the temporary volume.

Figure 9:
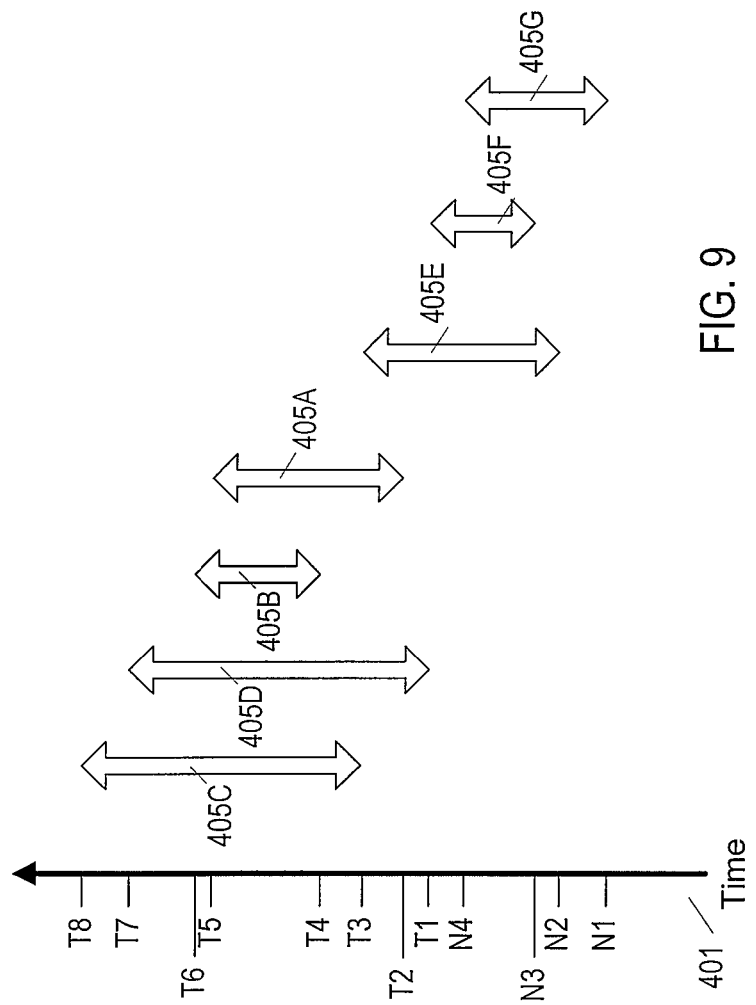
FIG. 9 illustrates an example in which the four files of FIG. 2 and three additional files need to be restored.

As noted above, in some cases there may not be a single point in time that occurs within all of the recovery time windows for all of the deleted files that need to be restored. For example, FIG. 9 illustrates an example in which the additional files 405E, 405F, and 405G need to be restored in addition to the four files 405A-405D. There is no single point in time that occurs within all seven of the recovery time windows for the seven files 405A-405G. Thus, it may be necessary to create multiple point-in-time temporary representations of the volume 84 to restore all seven of the files.

An algorithm to restore all of the files in this example may operate similarly as in the previous example described above. For example, the files may be first be sorted in a list. The intersection window may be set to the recovery time window for the first file in the list and may then be cumulatively intersected with the next files, processing the list of files in the sorted order. Thus, after the first four files 405A-405D have been processed the current intersection window may be set to the time period bounded by the times T4 and T5, as illustrated in FIG. 10A.

The algorithm may then attempt to intersect the intersection window with the recovery time window of the next file in the list, i.e., the file 405E. However, in this example, the intersection window does not intersect the recovery time window for the file 405E because the upper bound of the recovery time window (time T3) is before the lower bound of the intersection window (time T4).

The algorithm thus determines that the current intersection bounded by the times T4 and T5 is the final intersection window for the files 405A-405D. As illustrated in FIG. 10B the algorithm considers the four files 405A-405D to be a group of files that can all be restored from a single point-in-time representation of the volume, e.g., a representation corresponding to a time point within the final intersection window for the group 460A.

Figure 10C:
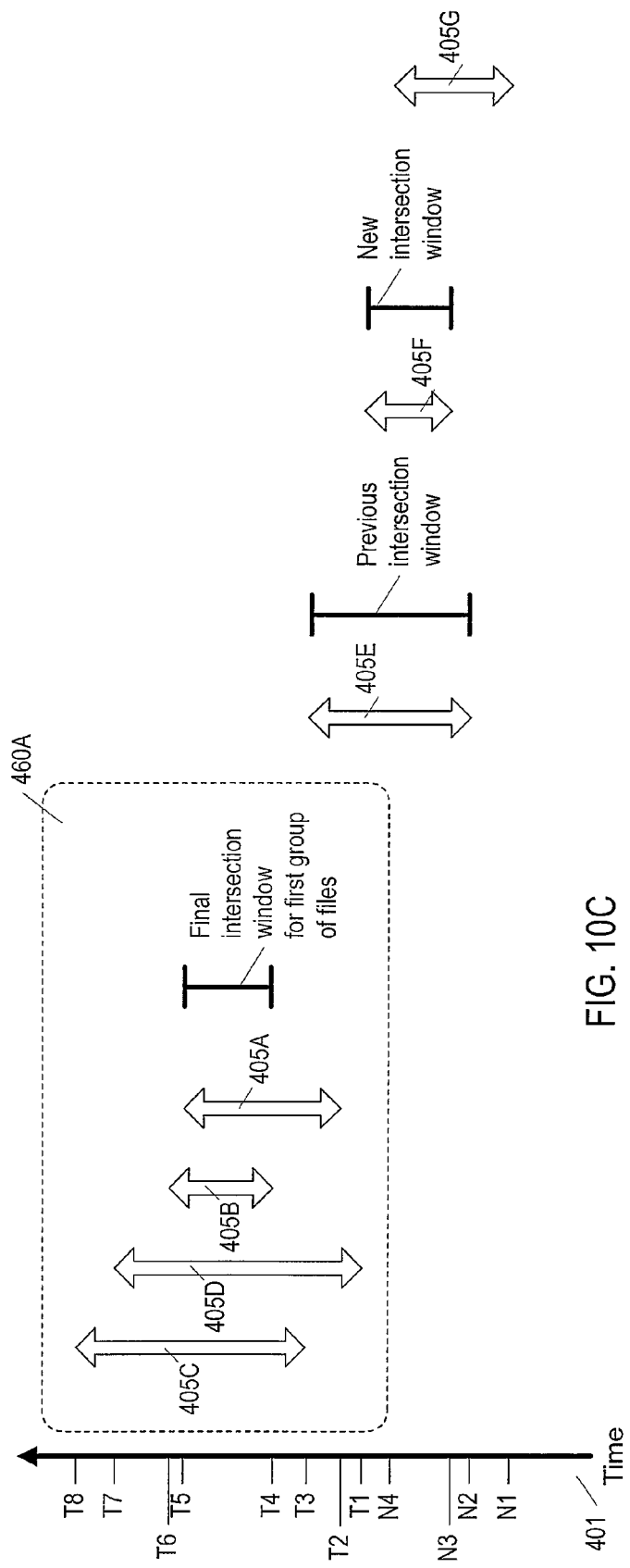
Figure 10D:
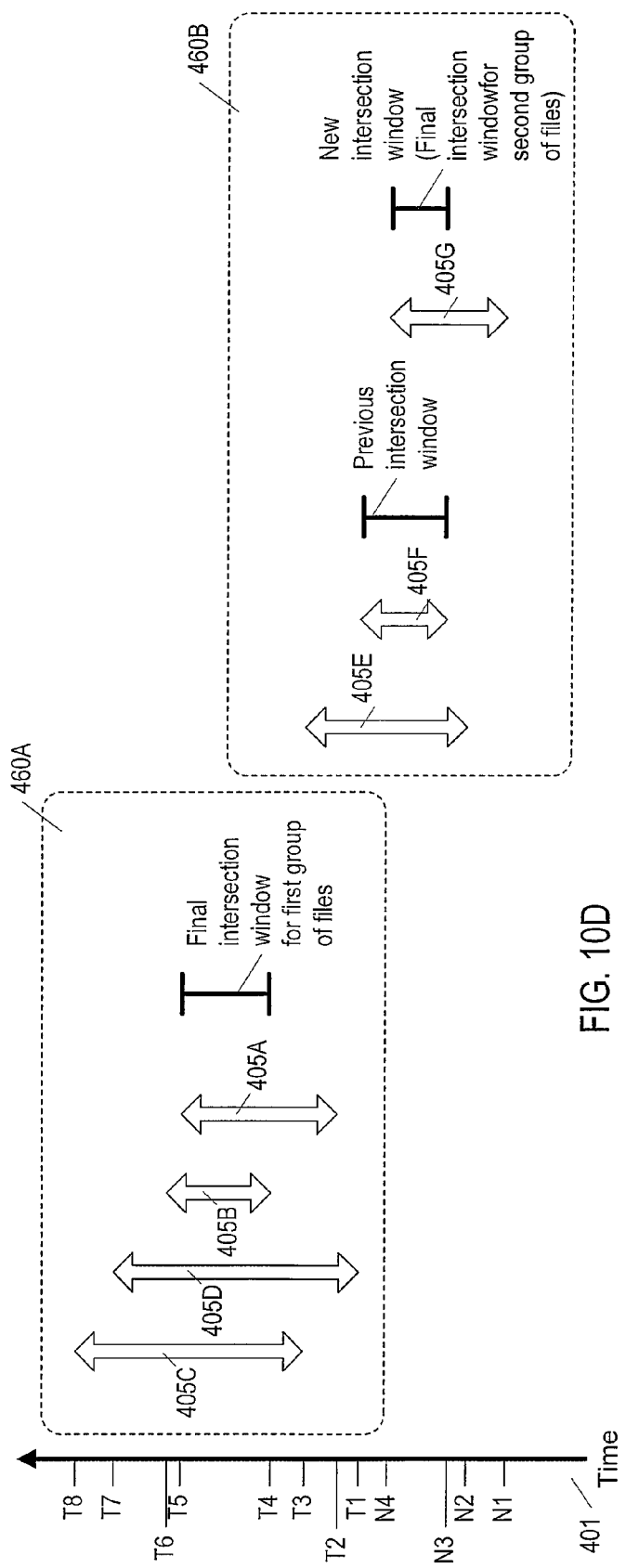

The algorithm then continues processing the files in the list that have not yet been processed in order to identify one or more other groups of files that can be restored from a single point-in-time representation of the volume. As illustrated in FIG. 10B, the algorithm sets a new intersection window to be the same as the recovery time window of the next file in the list, i.e., the file 405E. The algorithm then processes the remaining files 405F and 405G similarly as described above. As illustrated in FIG. 10C, the previous intersection window is intersected with the recovery time window for the file 405F to determine a new intersection window. This intersection window is then intersected with the recovery time window for the final file 405G, resulting in the final intersection window for the second group of files 460B, as illustrated in FIG. 10D.

Thus, as illustrated in FIG. 10E, in this example the algorithm has identified two groups of files, each having different respective intersection windows. The final intersection window for the first group of files is bounded by the times T4 and T5. The final intersection window for the second group of files is bounded by the times N3 and N4. The algorithm may restore the files in the first group of files from a temporary version of the volume 84 which represents the state of the volume as it existed at a point in time between the time T4 and the time T5. The algorithm may restore the files in the second group of files from another temporary version of the volume 84 which represents the state of the volume as it existed at a point in time between the time N3 and the time N4.

Figure 11:
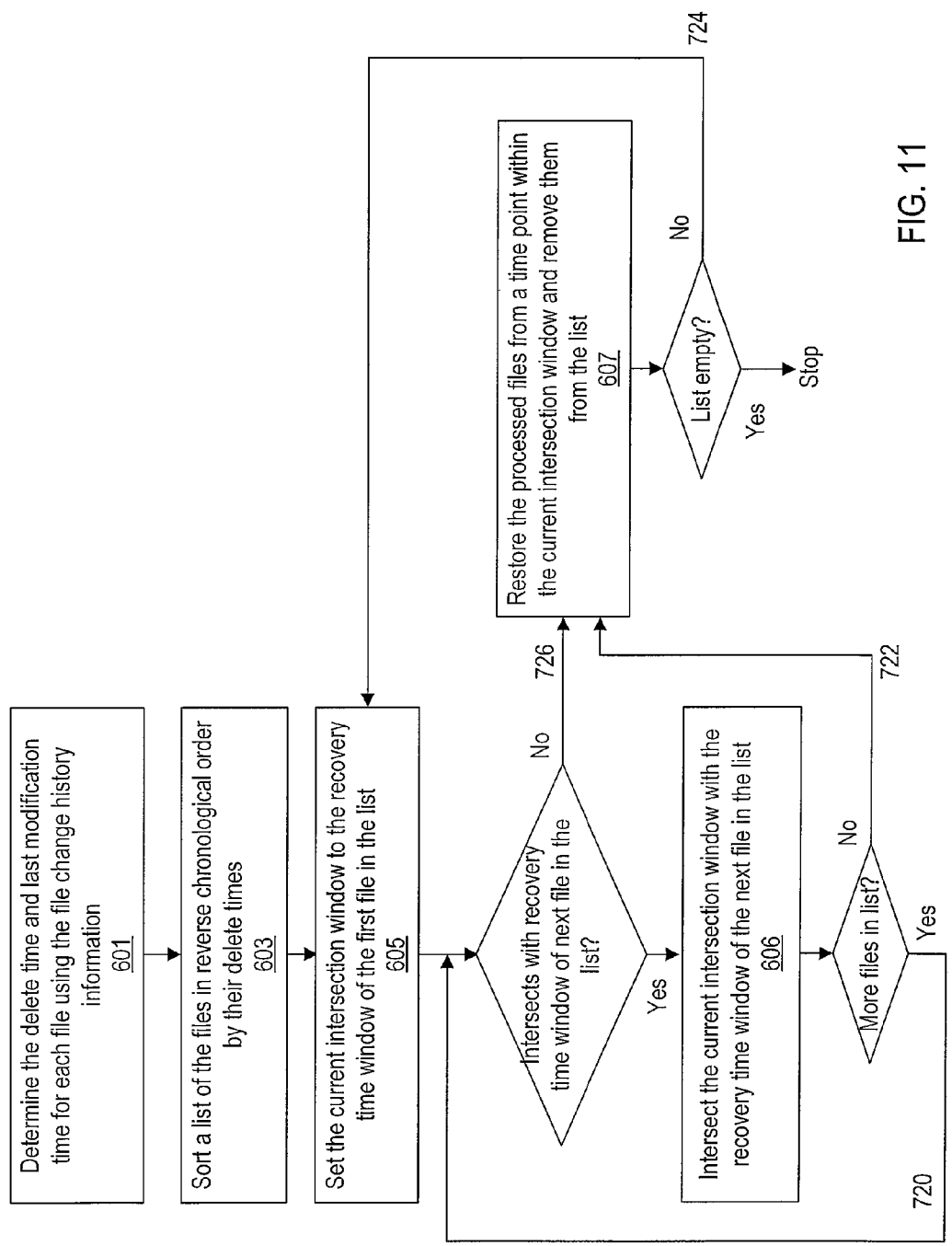
FIG. 11 is a flowchart diagram illustrating a more particular embodiment of a method for restoring a plurality of files deleted from a volume.

FIG. 11 is a flowchart diagram illustrating one embodiment of a method for restoring a plurality of files deleted from a volume. The method of FIG. 11 may be implemented by software, e.g., the backup and recovery software 205 executing on the host computer 82.

The backup and recovery software 205 may determine the delete time and last modification time for each file to be restored, as indicated in block 601. As discussed above, the respective delete time and the respective last modification time for each file define a recovery time window for the file. In various embodiments the delete times and last modification times may be determined in any of various ways. In some embodiments the backup and recovery software 205 may determine the respective times using file change history information 88.

The backup and recovery software 205 may sort a list of the deleted files in reverse chronological order by their delete times, as indicated in block 603.

As indicated in block 605, the backup and recovery software 205 may set a current intersection window to be the same as the recovery time window of the first file in the list. The backup and recovery software 205 may then determine whether the current intersection window intersects with the recovery time window of the next file in the list. If so, then the current intersection window may be reset to this intersection, as indicated in block 606. The algorithm may then determine whether there are more files in the list that need to be processed. If so then the method operation proceeds to continue attempting to intersect the current intersection window with the recovery time window of the next file in the list, as indicated by the flowchart arrow 720.

If there are no more files in the list that need to be processed after block 606 then the method operation proceeds to block 607, as indicated by the flowchart arrow 722. The backup and recovery software 205 may restore the files in the list that have been processed so far from a temporary version of the volume corresponding to a time point within the current intersection window. These files may then be removed them from the list.

If the list is empty after the files have been removed then all of the files have been restored, and the method stops. Otherwise, the method operation proceeds to block 605, as indicated by the flowchart arrow 724. The current intersection is then reset to be the same as the recovery time window of the first file in the list, i.e., the first file that has not yet been restored. The method operation then processed from block 605 similarly as described above.

Referring again to block 605, if the current intersection window does not intersect with the recovery time window of the next file in the list then the method operation proceeds to block 607, as indicated by the flowchart arrow 726.

In this manner, the method may process the list of files until all of the files have been restored. It is noted that FIG. 11 illustrates one particular embodiment of the method, and numerous alternative embodiments are contemplated. As one example, instead of sorting the list of files in reverse chronological order by their delete times, in other embodiments the method may sort the list of files in forward chronological order by their last modification times and then process the list in a similar manner as described above. As another example, in some embodiments the method may operate to first process the list to determine respective intersection time windows for different groups of files, and may then begin restoring the files after all of the intersection time windows have been determined.

Figure 12:
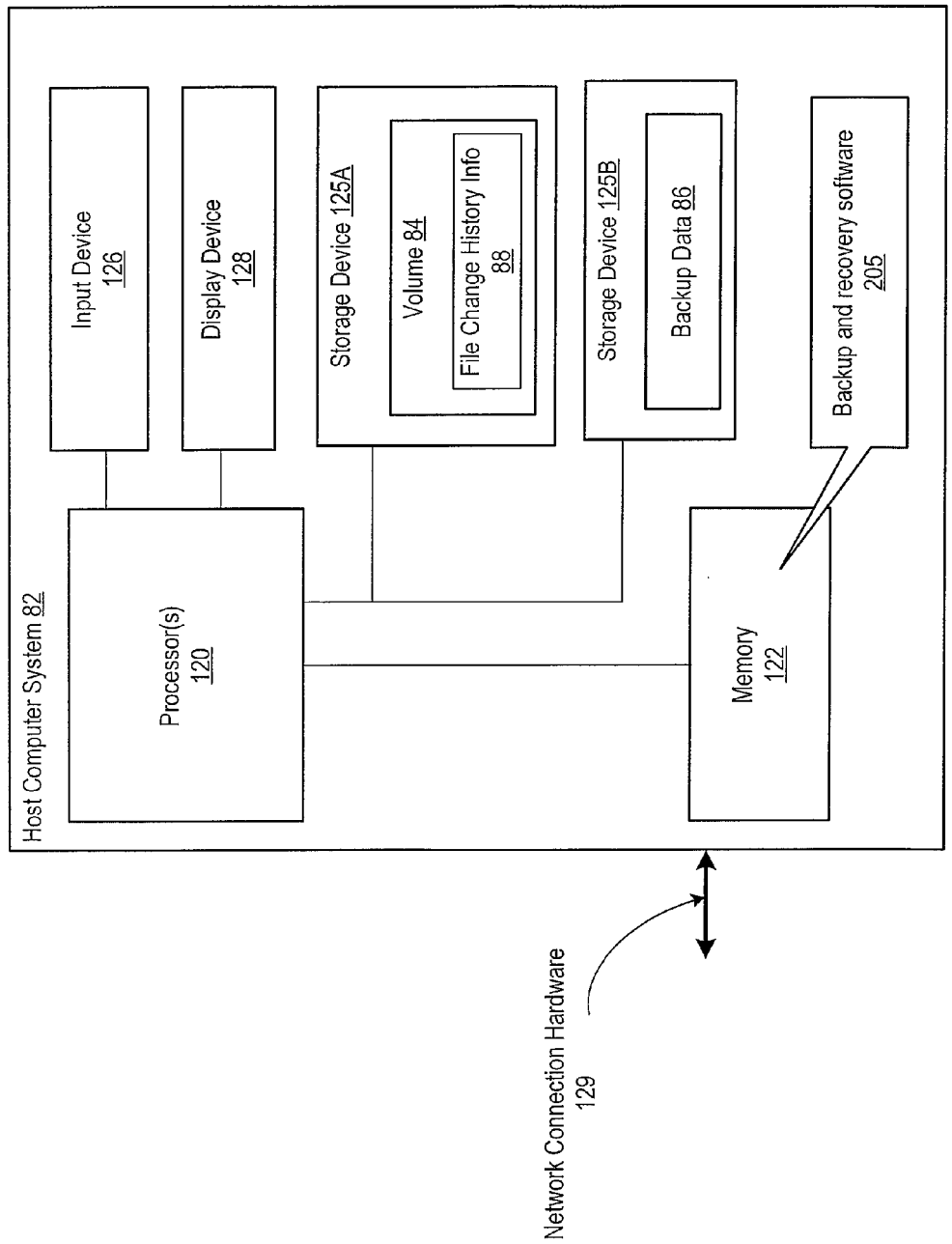
FIG. 12 illustrates an example embodiment of a host computer system configured to execute backup and recovery software which implements a method for restoring a plurality of files deleted from a volume.

Referring now to FIG. 12, an example embodiment of a host computer system 82 is illustrated. It is noted that FIG. 12 is provided as an example, and in other embodiments the host computer system 82 may be implemented in various other ways. In general, the host computer 82 may be any type of computer and may execute any operating system. Examples of computer systems include personal computer systems (PC's), workstations, portable computers (e.g., laptops or notebooks), intelligent storage devices, television systems, or other computing devices or combinations of devices.

In this example, the host computer system 82 includes one or more processors 120 coupled to memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store the backup and recovery software 205. The processor 120 may execute the backup and recovery software 205 to perform the functions described herein. In particular, the backup and recovery software 205 may execute to store the backup data 86 based on the volume 84, e.g., where the backup data 86 includes CDP log information and/or one or more backup images. The backup and recovery software 205 may also execute to restore a plurality of deleted files to the volume 84 from the backup data 86, e.g., using various embodiments of the methods or algorithms described above.

In various embodiments the backup and recovery software 205 may be implemented in any of various ways and may have any desired software architecture. In some embodiments the backup and recovery software 205 may include multiple modules or programs that operate in conjunction to perform the functions described herein. Also, in some embodiments the backup and recovery software 205 may utilize or operate in conjunction with various other software executing in the host computer system 82, such as operating system software, file system software, volume manager software, network communication software, etc.

Referring again to FIG. 12, it is noted that the processor 120 is representative of any type of processor. For example, in some embodiments, the processor 120 may be compatible with the x86 architecture, while in other embodiments the processor 120 may be compatible with the SPARC™ family of processors. Also, in some embodiments the host computer 82 may include multiple processors 120.

The host computer 82 may include or may be coupled to one or more storage devices 125 which store data in a non-volatile manner. For example, a storage device 125A may store the volume 84, and a storage device 125B may store the backup data 86. In some embodiments, file change history information 88 may be stored in the volume, e.g., in the form of one or more files that represent the file change history information 88.

In various embodiments the storage device(s) 125 may be any type of storage devices, may use any kind of storage media, and may be included in or coupled to the host computer system 82 in any of various ways. For example, in some embodiments the storage device(s) 125 may include one or more disk drives. In some embodiments the storage device(s) 125 may include a mass storage device or system. In some embodiments the storage device(s) 125 may be implemented as one or more hard disks configured independently or as a disk storage system. For example, the disk storage system may be an example of a redundant array of inexpensive disks (RAID) system. In an alternative embodiment, the disk storage system may be a disk array, or Just a Bunch Of Disks (JBOD), (used to refer to disks that are not configured according to RAID). In yet other embodiments, the storage device(s) 125 may include tape drives, optical storage devices or RAM disks, for example.

The host computer system 82 may also include one or more input devices 126 for receiving user input. The input device(s) 126 may include any of various types of input devices, such as keyboards, keypads, microphones, or pointing devices (e.g., a mouse or trackball). For example, in some embodiments the backup and recovery software 205 may provide a user interface that enables a user to input or request a plurality of deleted files to be restored. For example, the user may specify a list of the file names to be restored, or may specify wildcard or filtering criteria. If the user specifies wildcard or filtering criteria then the backup and recovery software 205 may determine a list of deleted files that match the criteria and may restore all of the matching files. For example, the list of matching files may be determined in some embodiments from the file change history information 88.

The host computer system 82 may also include one or more output devices 128 for displaying output. The output device(s) 128 may include any of various types of output devices or display devices, such as LCD screens or monitors, CRT monitors, etc. The user interface for the backup and recovery software 205 may be displayed on an output device 128.

The host computer system 82 may also include network connection hardware 129. In some embodiments the host computer system 82 may couple to a storage device 125 on which the volume 84 is stored and/or may couple to a storage device 125 on which the backup data 86 is stored through a network. For example, the network may include any type or combination of local area network (LAN), a wide area network (WAN), wireless networks, an Intranet, the Internet, etc. Examples of local area networks include Ethernet networks, Fibre Channel networks, Fiber Distributed Data Interface (FDDI) networks, and token ring networks. Also, each device may be coupled to the network using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-accessible storage medium storing program instructions executable to:

for each respective file of a plurality of files deleted from a volume, determine a respective recovery time window for the respective file, wherein the respective recovery time window for each respective file is defined by a time at which the respective file was last modified and a time at which the respective file was deleted;

in response to determining the recovery time windows for the plurality of files, automatically determine a particular point in time that is within the recovery time windows for two or more of the plurality of deleted files by calculating an intersection of the recovery time windows for the two or more files and determining a point in time within the intersection, wherein the intersection defines a time period in which the recovery time windows for the two or more files overlap;

in response to said determining the particular point in time, create a temporary version of the volume as it existed at the particular point in time; and restore each file of the two or more files to the volume from the temporary version of the volume.

2. The computer-accessible storage medium of claim 1,
wherein the two or more files are a first two or more files of the plurality of deleted files;
wherein the particular point in time is a first point in time;
wherein the temporary version of the volume is a first temporary version of the volume;
wherein the program instructions are further executable to:
  automatically determine a second point in time that is within the recovery time windows for a second two or more of the plurality of deleted files;
  in response to said determining the second point in time, create a second temporary version of the volume as it existed at the second point in time; and
  restore each file of the second two or more files to the volume from the second temporary version of the volume.

3. The computer-accessible storage medium of claim 1, wherein the program instructions are executable to calculate the intersection of the recovery time windows for the two or more files by:
  sorting a list of the plurality of deleted files in reverse chronological order by their delete times; and
  processing the files in the sorted order to calculate an intersection time window specifying the intersection of the recovery time windows for the two or more files.

4. The computer-accessible storage medium of claim 1, wherein the program instructions are executable to calculate the intersection of the recovery time windows for the two or more files by:
  sorting a list of the plurality of deleted files in forward chronological order by their last modification times; and
  processing the files in the sorted order to calculate an intersection time window specifying the intersection of the recovery time windows for the two or more files.

5. The computer-accessible storage medium of claim 1, wherein the program instructions are further executable to:
  receive a request to restore the plurality of deleted files to the volume, wherein the request specifies a file name of each of the plurality of deleted files;
  wherein the two or more files are restored to the volume in response to the request.

6. The computer-accessible storage medium of claim 1, wherein the program instructions are further executable to delete the temporary version of the volume after restoring the two or more files to the volume from the temporary version of the volume.

7. The computer-accessible storage medium of claim 1, wherein creating the temporary version of the volume as it existed at the particular point in time comprises using stored volume change information to reconstruct the volume as it existed at the particular point in time.

8. The computer-accessible storage medium of claim 1,
wherein continuous data protection (CDP) is enabled for the volume;
wherein creating the temporary version of the volume as it existed at the particular point in time comprises using CDP log information to create the temporary version of the volume.

9. A system comprising:
one or more processors; and
memory storing program instructions;
wherein the program instructions are executable by the one or more processors to:
  for each respective file of a plurality of files deleted from a volume, determine a respective recovery time window for the respective file, wherein the respective recovery time window for each respective file is defined by a time at which the respective file was last modified and a time at which the respective file was deleted;
  in response to determining the recovery time windows for the plurality of files, automatically determine a particular point in time that is within the recovery time windows for two or more of the plurality of deleted files by calculating an intersection of the recovery time windows for the two or more files and determining a point in time within the intersection, wherein the intersection defines a time period in which the recovery time windows for the two or more files overlap;
  in response to said determining the particular point in time, create a temporary version of the volume as it existed at the particular point in time; and
  restore each file of the two or more files to the volume from the temporary version of the volume.

10. The system of claim 9,
wherein the two or more files are a first two or more files of the plurality of deleted files;
wherein the particular point in time is a first point in time;
wherein the temporary version of the volume is a first temporary version of the volume;
wherein the program instructions are further executable by the one or more processors to:
  automatically determine a second point in time that is within the recovery time windows for a second two or more of the plurality of deleted files;
  in response to said determining the second point in time, create a second temporary version of the volume as it existed at the second point in time; and
  restore each file of the second two or more files to the volume from the second temporary version of the volume.

11. A method comprising:
executing program instructions on a computer system, wherein the program instructions execute to:
for each respective file of a plurality of files deleted from a volume, determine a respective recovery time window for the respective file, wherein the respective recovery time window for each respective file is defined by a time at which the respective file was last modified and a time at which the respective file was deleted;
in response to determining the recovery time windows for the plurality of files, automatically determine a particular point in time that is within the recovery time windows for two or more of the plurality of deleted files by calculating an intersection of the recovery time windows for the two or more files and determining a point in time within the intersection, wherein the intersection defines a time period in which the recovery time windows for the two or more files overlap;

in response to said determining the particular point in time, create a temporary version of the volume as it existed at the particular point in time; and restore each file of the two or more files to the volume from the temporary version of the volume.

12. The method of claim 11, wherein the two or more files are a first two or more files of the plurality of deleted files;

wherein the particular point in time is a first point in time;

wherein the temporary version of the volume is a first temporary version of the volume;

wherein the program instructions further execute to:
  automatically determine a second point in time that is within the recovery time windows for a second two or more of the plurality of deleted files;
  in response to said determining the second point in time, create a second temporary version of the volume as it existed at the second point in time; and
  restore each file of the second two or more files to the volume from the second temporary version of the volume.

\* \* \* \* \*